United States Patent [19]

Batson

[11] 4,158,913
[45] Jun. 26, 1979

[54] NIBBLER-TYPE CUTTER FOR NIBBLER-SHEAR TOOL

[75] Inventor: William A. Batson, Pickens, S.C.

[73] Assignee: The Singer Company, New York, N.Y.

[21] Appl. No.: 898,066

[22] Filed: Apr. 20, 1978

[51] Int. Cl.$^2$ .......................................... B26B 15/00
[52] U.S. Cl. ................................................. 30/241
[58] Field of Search ................. 30/228, 241, 242, 243

[56] References Cited

U.S. PATENT DOCUMENTS

| | | | |
|---|---|---|---|
| 3,022,576 | 2/1962 | Daman | 30/241 |
| 3,340,610 | 9/1967 | Hendrickson | 30/241 X |
| 3,785,052 | 1/1974 | Yermis | 30/241 |
| 3,828,432 | 8/1974 | Leibinger | 30/241 |
| 3,837,077 | 9/1974 | Filter | 30/241 |
| 3,861,037 | 1/1975 | Smith | 30/241 X |
| 3,988,829 | 11/1976 | Smida | 30/241 |

*Primary Examiner*—Jimmy C. Peters
*Attorney, Agent, or Firm*—Robert E. Smith; Harold Weinstein; Edward L. Bell

[57] ABSTRACT

A portable cutting tool, and particularly a tool designed as a nibbler-shear for use in cutting sheet material. The tool includes a power head with a changeable block, one for a shear type cutter and one for a nibbler type cutter. The one with the nibbler type cutter has a fixed cutter and a movable cutter. The movable cutter is reversibly mounted and has two cutting edges, one co-acting with the fixed cutter and the other to remain in a stored position for future use.

5 Claims, 9 Drawing Figures

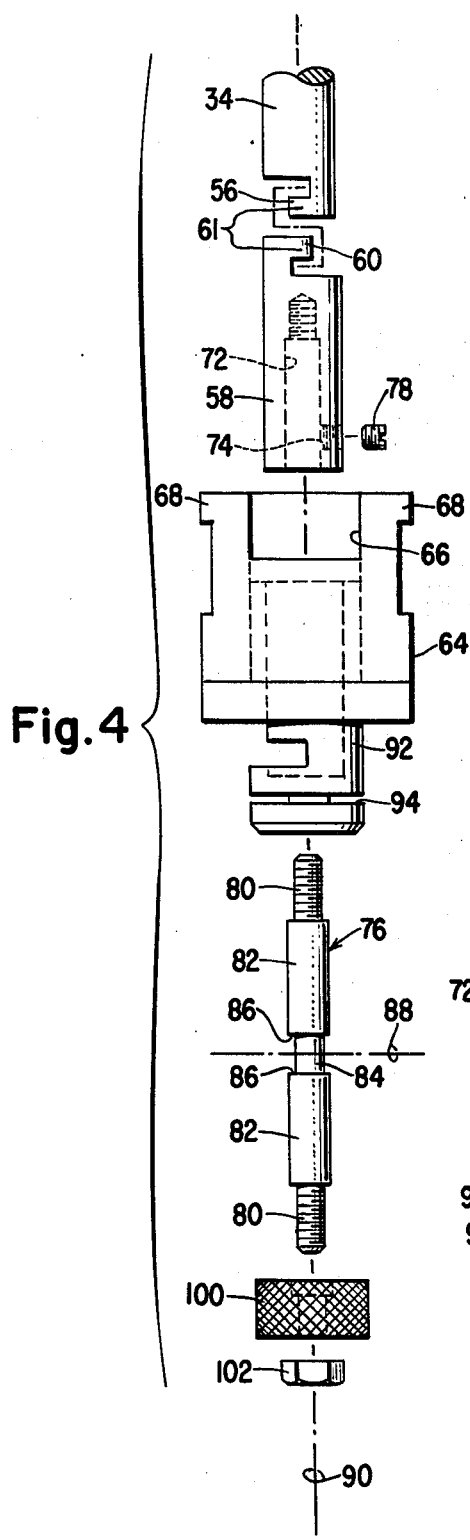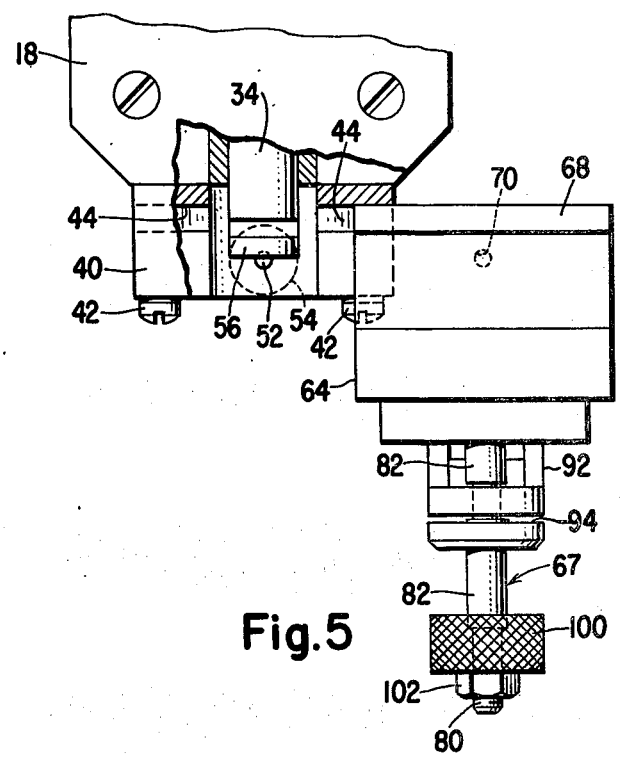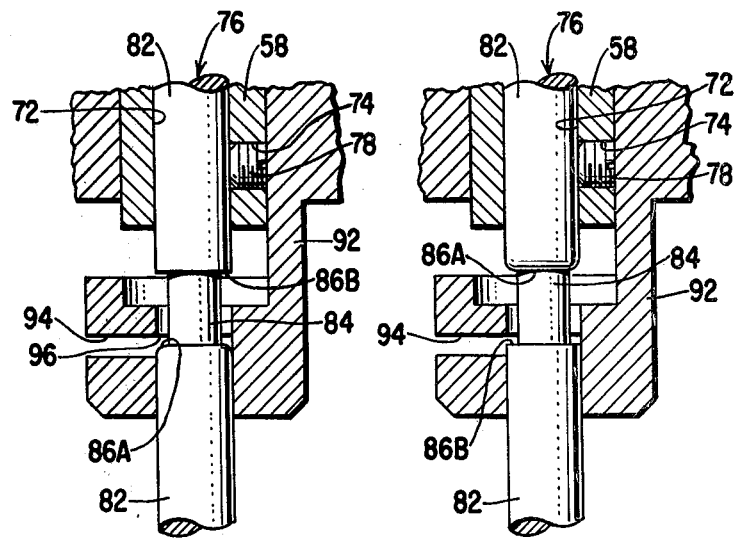

NIBBLER-TYPE CUTTER FOR NIBBLER-SHEAR TOOL

BACKGROUND OF THE INVENTION

Heretofore cutting tools of the prior art have used replaceable cutters so that when the parts became worn the old cutter would be discarded and a new cutter would be installed.

SUMMARY OF THE INVENTION

It is an object of the present invention to provide an improved nibbler-type cutter which overcomes the prior art disadvantages; which is simple, economical and reliable; which effectively doubles the life of the movable cutter; which is usable in a detachable nibbler slide block; and which is reversibly mounted in the nibbler slide block.

Other objects and advantages will be apparent from the following description of the invention and the novel features will be particularly pointed out hereinafter in the claims.

BRIEF DESCRIPTION OF THE DRAWINGS

This invention is illustrated in the accompanying drawings in which:

FIG. 4 is an exploded perspective view of the elements of the nibbler-type cutter.

FIG. 5 is a partial front elevational view showing the nibbler slide block engaging the slide way of the cutting tool.

FIG. 6 is a dramatized view showing the stored bit unused and the engaged bit worn.

FIG. 7 is a partial side elevational view showing the nibbler bit reversed so that the unused bit is mounted for the cutting operation.

DESCRIPTION OF THE INVENTION

Figures 1, 2, 3:
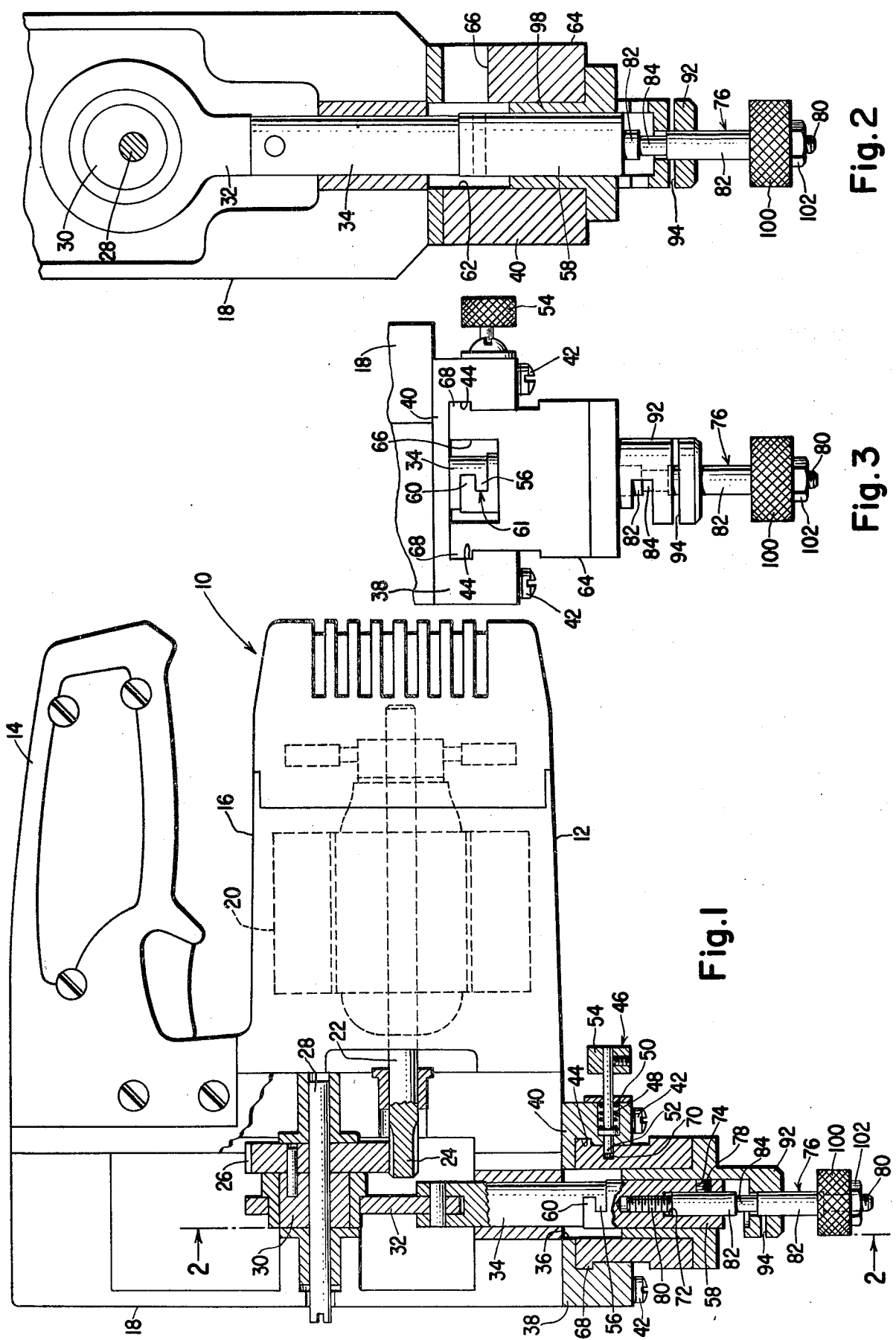
FIG. 1 is a side elevational view, partly in section, of a portable cutting tool constructed in accordance with the present invention.
FIG. 2 is a front elevational view, taken along lines 2—2 of FIG. 1.
FIG. 3 is a partial side elevational view showing the nibbler slide block connected to the cutting tool.

In the illustrated embodiment of the invention FIG. 1 shows a portable cutting tool of the nibbler-type, designated generally 10, having a housing 12 including a handle 14 disposed in superposition to a motor portion 16 and a head 18. An electric motor 20 is mounted within the motor portion 16 and includes a drive shaft 22 extending into the head 18 and having a splined end 24 that meshes with a gear 26 mounted on a shaft 28 journaled in the head 18 on an axis parallel to the axis of the shaft 22. An eccentric 30 illustrated in FIGS. 1 and 2 is secured for rotation with the shaft 28 and is connected through a link 32 to a bar 34 mounted for reciprocation in the head 18.

The lower end of the bar 34 as illustrated in FIG. 1 extends outwardly of the bottom of the housing 12 into a side or laterally extending opening 36 formed between a front mounting plate 38 and rear mounting plate 40, each secured to the head by screws 42. The oppositely facing side walls of the mounting plates 38 and 40 have aligned grooves 44, 44 illustrated in FIGS. 1, 3 and 5. A lock pin 46 is mounted in a counterbore 48 of the rear mounting plate 40 and bias by a spring 50 to have its tip 52 normally extended outwardly into side opening 36 from which it may be withdrawn by an operating grasping the handle 54 to pull the same in a direction away from the opening 36.

The lower end of bar 34 has a tongue and groove 56 formed thereon as is illustrated in FIGS. 1, 3, and 4. The bar 34 defines an upper bar which will connect to a lower bar 58 which has a tongue and groove 60 formed at its upper end to be slidingly received within the tongue and groove 56 of the bar 34 to form an interlocking box joint 61 therewith. Thus the bar 58 is keyed to the bar 34 and will unitarily reciprocate therewith upon operation of the motor 20.

The lower bar 58 is slidingly received within a central aperture 62 of a slide block 64 illustrated in FIGS. 1-4. The slide block 64 has a window 66 formed on the forward side thereof as viewed in FIGS. 2 and 3 to permit proper alignment of the respective tongue and groove 56 and 60 connection so as to form the box joint 61.

The slide block 64 is substantially rectangular, with the longer sides thereof facing the front and rear as viewed in FIG. 1 and having tongues 68, 68 formed thereon. When the slide block 64 is slid laterally as illustrated in FIG. 5 within the mounting plates 38 and 40 a tongue and groove connection will be made between tongue 68 and grooves 44. Of course, during the tongue and groove connection the lock pin 46 will be removed from its blocking position so that once the connection is made the tip 52 thereof will enter a locking hole 70 shown in FIG. 1. Thus assembled the slide block 64 is held against movement relative to the head 18. Whenever it is desired to remove the slide block 64 the lock pin 46 will be pulled outwardly to remove the tip 52 from the hole 70 to permit the lateral sliding disassembly movement of the slide block 64 relative to the head 18.

A tapped counterbore 72 extends upwardly from the bottom of the mounting bar 58 as shown in FIGS. 1 and 4, with a tapped hole 74 formed at the lower end of the side opposite the tongue 60 and extending through to the bore 72. A cutter 76 is threadedly received within the tapped counterbore 72 and secured therein by a set screw 78 connected within the hole 74 to engage the side wall or shank of the cutter 76.

The cutter 76 is symmetrically formed so that the side above its mid-point is the mirror-image of the side below the mid-point and therefore the cutter 76 can be mounted from either end. The cutter 76 is best seen in FIGS. 1 and 4 and has a threaded portion 80 at the upper and lower ends thereof which terminates in a cylindrical shank portion 82 with the inner ends of the opposite shanks 82, 82 terminating in a neck down portion 84 of reduced diameter which defines oppositely facing annular shoulders 86, 86 each of which define an annular cutting edge. A hypothetical mid-plane 88 would lie perpendicular to the axis 90 of the cutter 76 mid-way between the shoulders 86, 86 to dissect the neck down portion 84. The slide block 64 includes a ledger element 92 having a slot 94 formed at its lower end to receive the sheet material to be cut. The upper edge 96 of the slot 94 defines a fixed cutter adjacent the axial aperture 62 and will co-act with the lower of the cutting edges or shoulders 86 of the cutter 76 on the upstroke of the bar 34 to remove a cresent-shape section of the sheet material. The ledger element 92 is suitably secured to the slide block 64 so as to affix the annular upper sleeve 98 within the aperture 62 wherein its inner periphery will journal the reciprocatory motion of the mounting bar 58.

Subsequent to the cutter being threadedly connected to the mounting bar 58 its threaded lower end 80 will extend below the ledger element 92 to receive thereon a cutter knob 100 held in place by a nut 102 threadedly received on the end 80 as illustrated in FIGS. 1 and 4. During the lateral slide mounting of the slide block 64 to the mounting plates 38 and 40 the knob 100 will be used to align the mounting bar 58 with the bar 34 as by rotating the same so as to permit the slide motion of the interlocking connection between the respective tongue and grooves of the bars 34 and 58. Once the alignment has been obtain the slide block 64 is assembled to the head 18 thus keying the respective bars 34 and 58 for unitary reciprocal motion upon operation of the motor 20. The connection of the bars 34 and 58 is adapted to be detached upon the disassembly of the slide block 64 from the mounting plates 38 and 40.

Though the tolerances are close there is sufficient clearance to permit the reciprocal motion of the bars 34 and 58 and the cutter 76 within the journaled components thereof. After an unspecified period of time depending on the care and the nature of the sheet material being cut, the engaged moving cutting edge will eventually wear as illustrated in FIG. 6 by the worn or rounded cutting edge or shoulder 86A which has been in use during the cutting operation. A second fresh cutting edge 86B is shown in stored position immediately above the worn edge 86A and upon reversal of the cutter 76, which the operator may readily accomplish, the assembly will be as shown in FIG. 7 wherein the fresh cutting edge 86B is in position for the cutting operation wherein it will co-act with the upper cutting edge 96 of the slot 94. Through the simple device of reversing the cutter 76 the effective life of the cutter 76 has been substantially doubled.

Figure 8:
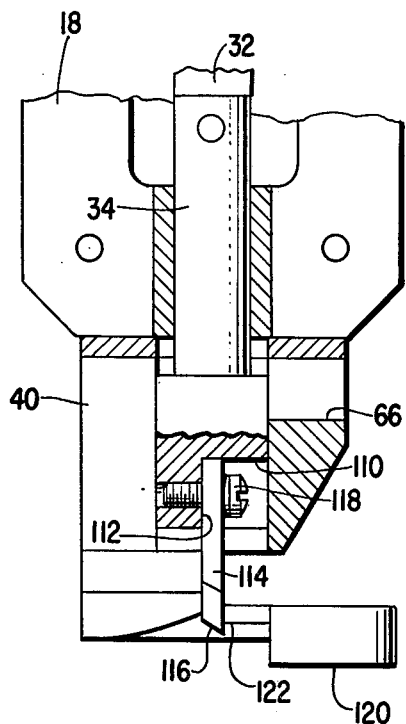
FIG. 8 is a partial front elevational view of the shear type cutter, partly in section.
Figure 9:
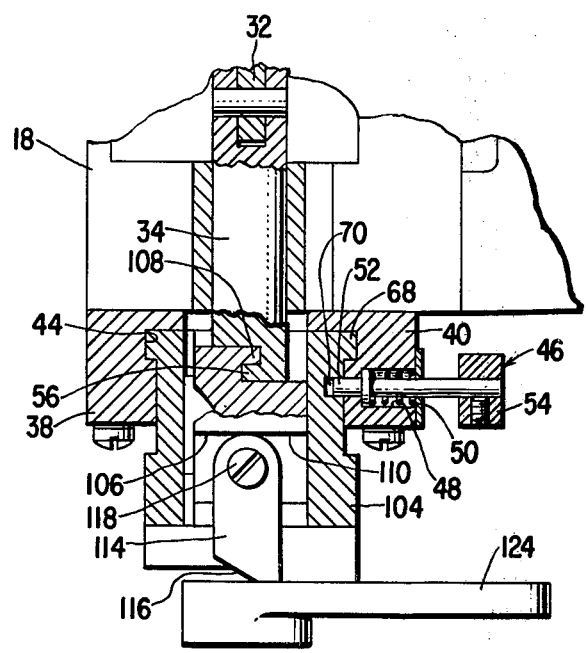
FIG. 9 is a partial side elevational view of the shear type cutter, partially in section.

FIGS. 8 and 9 show the head 18, the bar 34 to which a second slide block 104 is connected to the mounting plates 38 and 40 in the same tongue and groove type detachable connection. During the lateral assembly motion of the slide block 104 a connecting member 106 having a tongue and groove top portion 108 is slidingly received in the tongue and groove 56 of the bar 34. The connecting member 106 is mounted within the slide block 104 for reciprocal motion therein. The connecting member 106 has a side cutout 110 formed at its lower end to define a vertical seating surface 112 which receives a shear type cutter 114 having a cutting edge 116 and being secured thereto by a screw 118. The shear type cutter 114 cooperates with a ledger element 120 having a ledger blade 122 carried by an arm 124 suitably secured to the bottom of the slide bracket 104.

It will be understood that various changes in the details, materials, arrangements of parts and operating conditions which have been herein described and illustrated in order to explain the nature of the invention may be made by those skilled in the art within the principles and scope of the invention.

Having thus set forth the nature of the invention what is claimed herein is:

1. A portable nibbler-type cutting tool comprising:
   a. a housing,
   b. a motor mounted in the housing,
   c. a ledger connected to the housing,
   d. a fixed cutter connected to the ledger,
   e. a bar journaled in the housing and connected to be reciprocally driven by the motor,
   f. a cutter having connecting means formed on opposite ends thereof,
   g. one of the ends of the cutter connected to the bar whereby the cutter will be reciprocated with the bar,
   h. a pair of cutter edges formed on the cutter in facing relationship to each other to define one of the cutter edges as a selective movable cutter,
   i. the movable cutter coacting with the fixed cutter to cut material, and
   j. the other cutter edge being in a stored position and adapted to become the movable cutter whenever the cutter is reversed to connect the other end of the cutter to the bar.

2. The combination claimed in claim 1 wherein:
   a. a slide block has the ledger connected thereto,
   b. a mounting plate connected to the housing for lateral sliding detachable connection thereto of the slide block,
   c. the bar has a laterally removable lower section,
   d. the lower section of the bar reciprocally mounted within the slide block and carrying the cutter, and
   e. a knob connected to the free end of the cutter to rotate the cutter and to align the lower section relative to the bar to permit lateral coupling thereto upon the slide block being connected to the mounting plates.

3. The combination claimed in claim 2 wherein:
   a. the upper section of the bar having a tongue and groove formed at the lower end,
   b. the lower section of the bar having a tongue and groove at its upper end to be laterally coupled with the tongue and groove of the upper section,
   c. the lower section of the bar having a tap counterbore extending upwardly from the bottom thereof,
   d. the cutter having threaded portions at each end,
   e. one of the threaded portions of the cutter connected within the tapped counterbore of the bar, and
   f. the knob connected to the other threaded portion of the cutter.

4. The combination claimed in claim 3 wherein:
   a. a window is formed in the slide block,
   b. the coupling of the upper and lower sections of the bar is viewable from the window, and
   c. the knob to rotate the cutter and to align the tongue and groove of the lower section is within the view of the window to permit lateral coupling of the upper and lower sections of the bar.

5. The combination claimed in claim 1 wherein:
   a. the movable cutter is formed by an annular shoulder having a 360° cutting edge, and
   b. the fixed cutter has the material to be cut presented to less than 180° of the movable cutter.

* * * * *